US009448614B2

(12) United States Patent
Slik (10) Patent No.: US 9,448,614 B2
(45) Date of Patent: *Sep. 20, 2016

(54) LOW POWER ARCHIVAL DATA STORAGE ENCLOSURE

(71) Applicant: NetApp, Inc., Sunnyvale, CA (US)

(72) Inventor: David Slik, Burnaby (CA)

(73) Assignee: NETAPP, INC., Sunnyvale, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/276,823

(22) Filed: May 13, 2014

(65) Prior Publication Data

US 2015/0331477 A1   Nov. 19, 2015

(51) Int. Cl.
G06F 1/28 (2006.01)
G06F 1/32 (2006.01)
G06F 3/06 (2006.01)

(52) U.S. Cl.
CPC .............. *G06F 1/3287* (2013.01); *G06F 1/28* (2013.01); *G06F 1/3209* (2013.01); *G06F 3/06* (2013.01); *G06F 3/0625* (2013.01)

(58) Field of Classification Search
CPC ........... G06F 1/28; G06F 1/32; G06F 1/3287
See application file for complete search history.

(56) References Cited

U.S. PATENT DOCUMENTS

| 8,009,577 | B2* | 8/2011 | Karam ................ H04M 1/2535 370/252 |
| 8,738,936 | B2* | 5/2014 | Sakagami ............. G06F 1/3203 713/300 |
| 8,751,836 | B1* | 6/2014 | Piszczek .............. G06F 1/3268 713/300 |
| 2007/0011472 | A1* | 1/2007 | Cheng ................... G06F 1/266 713/300 |

* cited by examiner

*Primary Examiner* — Thuan Du
(74) *Attorney, Agent, or Firm* — Gilliam IP PLLC (57) ABSTRACT

A method of controlling power within a multiple-data-storage-devices enclosure is disclosed. In at least one embodiment, the method comprises receiving a network connection and power from a data connection port to which a network cable is removably coupled; identifying one or more target data storage devices within the multiple-data-storage-devices enclosure to activate, wherein the one or more target data storage devices are a subset of all data storage devices within the multiple-data-storage-devices enclosure; powering off at least one of the data storage devices that draws power from the data connection port to make available additional power to supply from the data connection port; and powering the target data storage devices with the power received through the data connection port to activate the target data storage devices after all other data storage devices are powered off.

20 Claims, 8 Drawing Sheets

LOW POWER ARCHIVAL DATA STORAGE ENCLOSURE

RELATED FIELD

This disclosure relates generally to a data storage system (also, "storage system"), and in particular to archival storage systems for infrequently accessed data.

BACKGROUND

Commercial enterprises (e.g., companies) and others gather, store, and analyze an increasing amount of data. In fact, the trend now is to store and archive almost all data before making a decision on whether or not to analyze the stored data. Although the per unit costs associated with storing data has declined over time, the total costs for storage has increased for many companies because of the volumes of stored data. Hence, it is important for companies to find cost-effective ways to manage their data storage environments for storing and managing large quantities of data. Companies now manage these costs by having various tiers of storage, with different costs associated with each of these tiers. Each tier can have different data storage hardware (e.g., storage processor, storage medium, storage I/O network, etc.) and different storage services (e.g., data maintenance, data integrity check, backup, snapshots, etc.). Companies can use the different tiers of storage for different types of data. As an example, to store data that is accessed frequently, companies may use a data storage tier that has high performance characteristics. On the other hand, for big data applications, companies often prefer high density and high storage volume archival storage systems, which tend to be less expensive on a per unit basis. However, it is often a challenge to keep the cost down for these archival storage systems due to the necessity of maintaining a large number of data storage devices.

The figures depict various embodiments of the disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Disclosed are embodiments of an archival data storage system implemented by multiple-data-storage-devices cartridges. Each multiple-data-storage-devices cartridge ("cartridge") is an enclosure of two or more data storage devices, in which a subset of the data storage devices (e.g., a single data storage system) can be supplied power and accessed at a time. The archival storage system is designed to store data that is rarely accessed ("cold" data). To save cost, the data storage devices used inside the cartridges are storage devices that may have a limited lifetime. For example, each data storage devices used with the cartridges may be designed to read data more frequently than to write data or vice versa. In some embodiments, data are only be permitted to be written on to each data storage device once. In some embodiments, at least some of the data storage devices may be likely to fail after ten or so end-to-end read accesses. The reduced lifetime may be a consequence of using lower quality components, e.g., read heads in the data storage devices. Lower-quality components generally lead to lower costs, so when used appropriately, they can lower the total solution cost.

The data storage devices can be low-cost archival-class disk drives or other high-density data storage devices. The archival storage system is designed for cold data that is generally written only once to a data storage device and read back a few times, but not frequently. In some embodiments, one can estimate the limited lifetime of a data storage device by the number of write operations and the number of read operations (e.g., estimating based on a total number of operations or estimating based on the maximum of either the number of write operations or the number of read operations).

The multiple-data-storage-devices cartridges enable low-power and high density data storage architecture. The disclosed cartridge comprises two or more data storage devices, electronic circuitry to manage the data storage devices, and a data communication port. The electronic circuitry may include a memory and a data processing component, e.g., a processor, a controller, an application-specific integrated circuit (ASIC), a field programmable gate array (FPGA), other integrated circuit (IC) board, or any combination thereof In some embodiments, the processing component is a reduced instruction set computing ("RISC") processor, e.g., of a type commonly employed in cellular telephone handsets. The data processing component manages data storage devices in the same cartridge as the data processing component.

The electronic circuitry further includes at least a network and power component, a power control/management component, and a storage controller. The network and power component includes or is directly coupled to the data communication port. The data communication port is adapted to receive a network cable, for example, an Ethernet cable. The network and power component can transmit and receive data through as well as derive power from the network cable.

The power control component manages the supply of power derived from the network and power component through the network cable. The power control component can individually power on and off each of the data storage devices as well as other individual components/modules or sets of components/modules of the electronic circuitry. The power control component can implement a power selection ("switching") mechanism to establish data access to a target set (e.g., one or more) of data storage devices while preserving power by withholding power from other components/modules not associated with the target set. After initially supplying power to the target set, the power control component waits until power consumption from the target set stabilizes into a steady-state before powering on subsystems that facilitate data access to the target set. For example, the storage controller for the target set may be powered on after the power consumption by the target set stabilizes.

The storage controller can provide a physical network layer communication interface to the data storage devices. After the storage controller powers on, the power control component can supply power to an I/O subsystem servicing the target set of the data storage devices. The data processing component can then execute and maintain a service program that mounts the target set of data storage devices to provide access (e.g., read or write access) to these data storage devices from external clients. The service program can communicate with these external clients through the network and power component, e.g., through the network cable.

The disclosed power switching mechanism can receive power from the network cable (e.g., using "Power over Ethernet") at the network and power component and can receive an access request (e.g., read or write request) through the network cable. The data processing component can then identify a target set of data storage devices to activate based at least in part on the access request. For example, the data processing component may identify one of several data storage devices that has the requested to be read or has storage space to store the data requested to be written. The data processing component can then power off components within the multiple-data-storage-devices enclosure other than the target set of data storage devices. The power control component can monitor the power consumption level of the target set to ensure that a power requirement to activate the target set of the target data storage devices is sufficiently provided by the received power. As an example, the power central component can wait until power usage stabilizes. Alternatively, the power control component can wait for a specified period of time. When power is sufficiently available, the power control component can supply power to the target set.

The power control component can continue to monitor the power level drawn from the network cable to determine when a first power consumption spike, responsive to turning on the target set, flattens/stabilizes to a steady-state. For example, when a hard disk drive spins up, a large amount of power is consumed before the power consumption level drops down to a steady-state. The power control component can wait until the power consumption level of the target set stabilizes before activating other subsystems to provide data access to the target set of data storage devices.

The power control component can provide power (e.g., activate) in turn to a sequence of subsystems (e.g., any combination of a storage controller, an I/O module, a network module, a data processing component, etc.). Each subsystem can include one or more components of the multiple-data-storage-devices cartridge or the electronic circuitry. Each subsystem can facilitate access to a particular data storage device. The specified sequence can be stored, e.g., on a memory device of the electronic circuitry, or hardcoded into the power control component. The power control component can continue to supply power (e.g., activate) each subsystem within the sequence while checking whether power consumption of a previous subsystem has reached a steady-state.

The disclosed power control architecture enables the cartridges/enclosures to utilize a power supply with a limited power (e.g., Power over Ethernet adapter). Such power supply has a maximum amount of power that can be drawn. The power switching mechanism described ensures that this maximum power level is not exceeded.

Figure 1A:
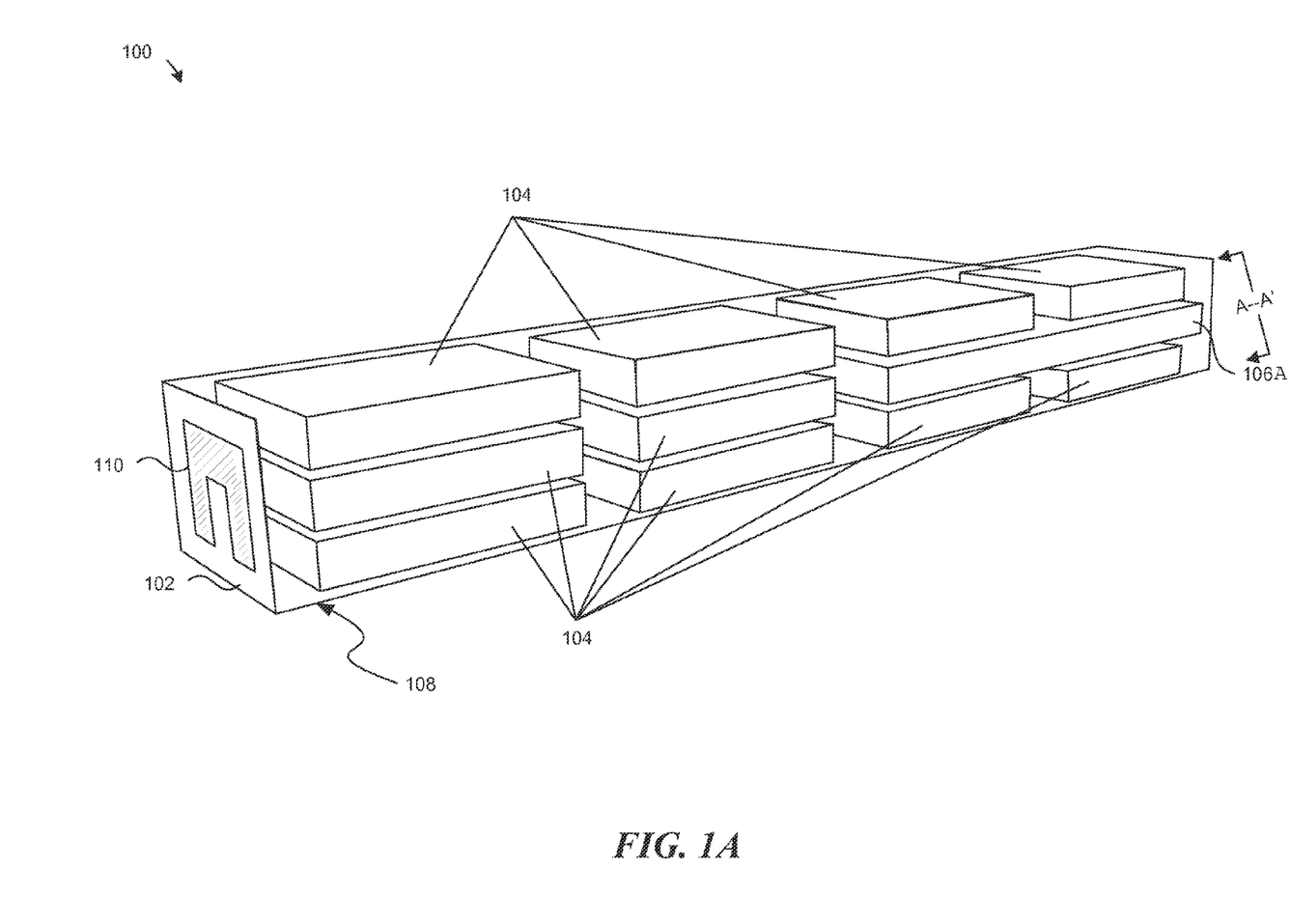
FIG. 1A is a perspective plan view of a first example of a multiple-data-storage-devices cartridge and components therein, consistent with various embodiments.

FIG. 1A is a perspective plan view of a first example of a multiple-data-storage-devices cartridge 100A (the "cartridge 100A") and components therein, consistent with various embodiments. The cartridge 100A includes an enclosure shell 102 (partially shown) that encloses and protects multiple data storage devices 104. The data storage devices 104 may be hard drives, solid-state drives, flash drives, or any combination thereof. It is noted that the term "enclose" does not necessarily require sealing the enclosure and does not necessarily require enveloping all sides of the enclosure.

The cartridge 100A further includes control circuitry 106A that manages the power supply of the cartridge 100A, the data access to and from the data storage devices 104, and other storage operations to the data storage devices 104. The control circuitry 106A may implement each of its functions as a single component or a combination of separate components.

As shown, the cartridge 100A is adapted as a rectangular prism that sits on an elongated surface 108 of the rectangular prism. Each of the data storage devices 104 may be stacked within the cartridge 100A. For example, the data storage devices 104 can stack on top of one another into columns. The control circuitry 106A can stack on top of one or more of the data storage devices 104 and one or more of the data storage devices 104 can also stack on top of the control circuitry 106A.

In various embodiments, the enclosure shell 102 encloses the data storage devices 104 without providing window openings to access individual data storage devices or individual columns of data storage devices. In these embodiments, each of the cartridge 100A is disposable such that after a specified number of the data storage devices 104 fail, the entire cartridge can be replaced as a whole instead of replacing individual failed data storage devices. Alternatively, the cartridge 100A may be replaced after a specified time, e.g., corresponding to an expected lifetime.

The illustrated stacking of the data storage devices 104 in the cartridge 100A enables a higher density of standard disk drives (e.g., 3.5 inch disk drives) in a standard shelf (e.g., a 19 inch width rack shelf). Each of the cartridge 100A can store ten of the standard disk drives. In the cases that the data storage devices 104 are disk drives, the cartridge 100A can hold the disk drives "flat" such that the axes of the spinning disks are parallel to the gravitational field.

The cartridge 100A may include a handle 110 on one end of the enclosure shell 102 and a data connection port 112 (not shown) on the other end. The handle 110 is attached on an outer surface of the enclosure shell 102 to facilitate carrying of the cartridge 100A. The enclosure shell 102 exposes the handle 110 on its front surface. For example, the handle 110 may be a retractable handle that retracts to fit next to the front surface when not in use.

Figure 1B:
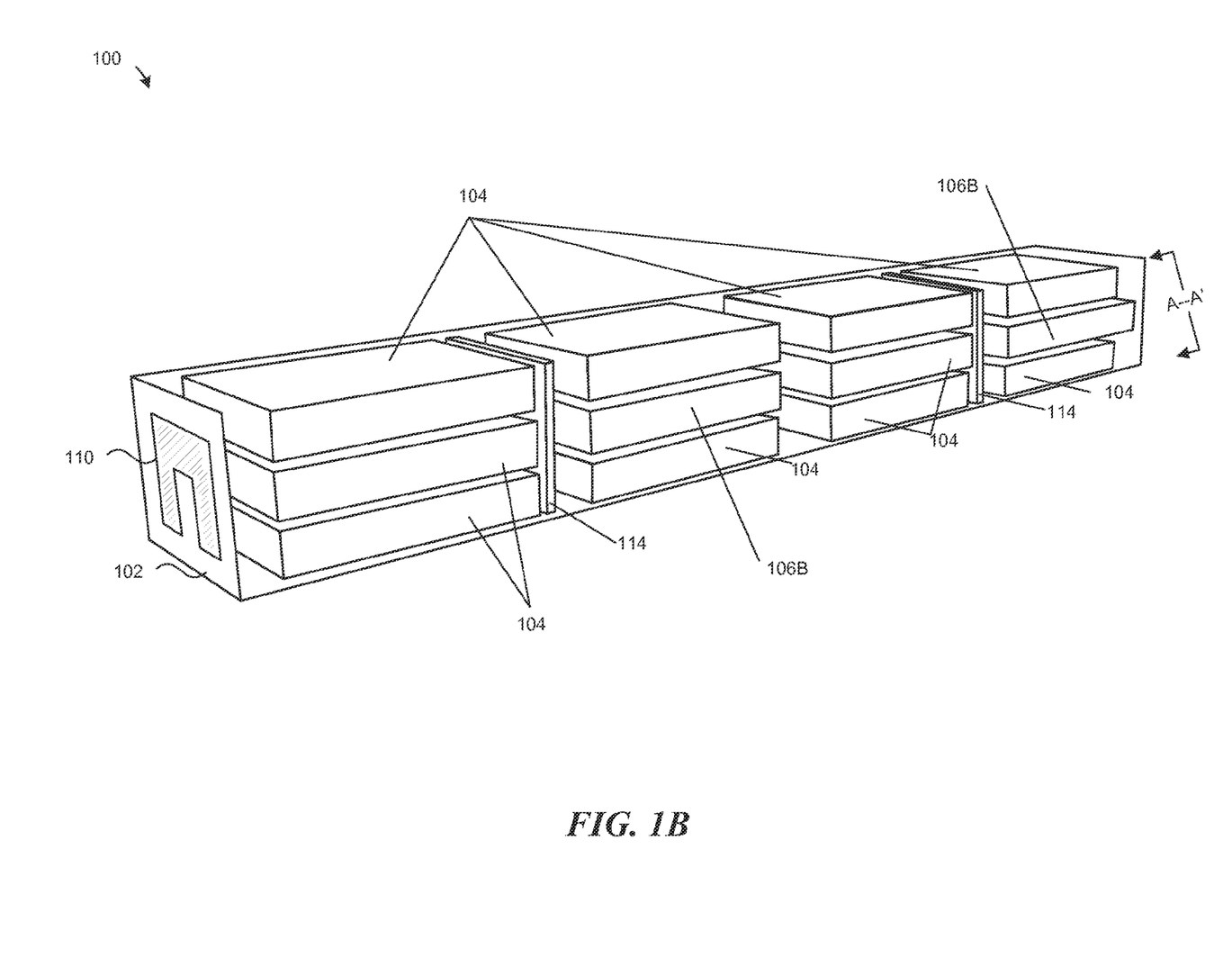
FIG. 1B is a perspective plan view of a second example of a multiple-data-storage-devices cartridge and components therein, consistent with various embodiments.
Figure 1C:
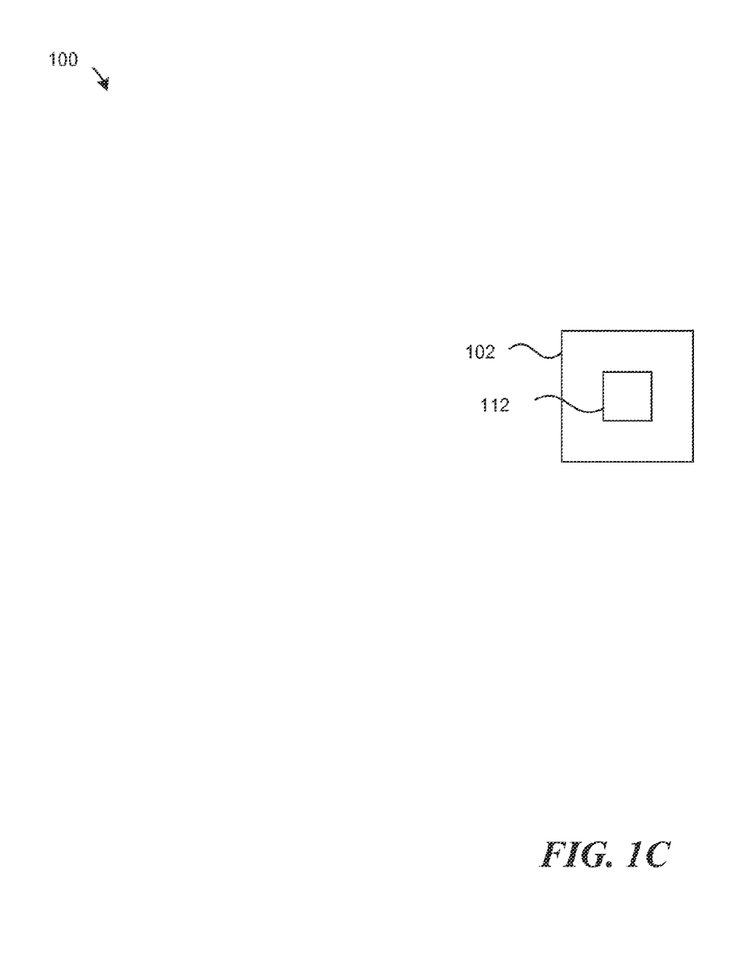
FIG. 1C is a backside view of the multiple-data-storage-devices cartridge of FIG. 1A or FIG. 1B, consistent with various embodiments

FIG. 1B is a perspective plan view of a second example of a multiple-data-storage-devices cartridge 100B (the "cartridge 100B") and components therein, consistent with various embodiments. The cartridge 100B includes some of the same components (e.g., the enclosure shell 102, the data storage devices 104, the handle 110, and the data connection port 112 (not shown)) as the cartridge 100A. In the illustrated example, the cartridge 100B has control circuitry 106B that is divided into separate components (e.g., circuit boards) each having a smaller geometric profile than the control circuitry 106A of FIG. 1A. Additionally, the cartridge 100B includes midplane boards 114. In some embodiments, the midplane boards 114 include passive components, such as component interfaces for connectors between the data storage devices 104 and the control circuitry 106B. In other embodiments, the midplane boards 114 include active circuitry, such as circuitry for power switching, a SATA multiplier, or a combination thereof FIG. 1C is a backside view of the multiple-data-storage-devices cartridge 100A of FIG. 1A or the multiple-data-storage-devices cartridge 100B of FIG. 1B, consistent with various embodiments. For example, the backside view can be taken from a perspective along A-A' as shown in FIG. 1A and FIG. 1B. The enclosure shell 102 encloses the data storage devices 104 (not shown) and the control circuitry 106A or the control circuitry 106B (both not shown), and exposes a data connection port 112, e.g., an Ethernet port. The data connection port 112 is a component attached to the control circuitry 106A or the control circuitry 106B. The data connection port 112 is an interconnection interface that accepts or plugs into a communication medium, e.g., Ethernet cable. The data connection port 112 may be the only component within the cartridge 100A exposed outside the enclosure shell 102. For example, the data connection port 112 can accept an Ethernet cable carrying communication signals and power in accordance with the Power over Ethernet (PoE) standards (e.g., IEEE 802.3af-2003 or IEEE 802.3at-2009).

Figure 2A:
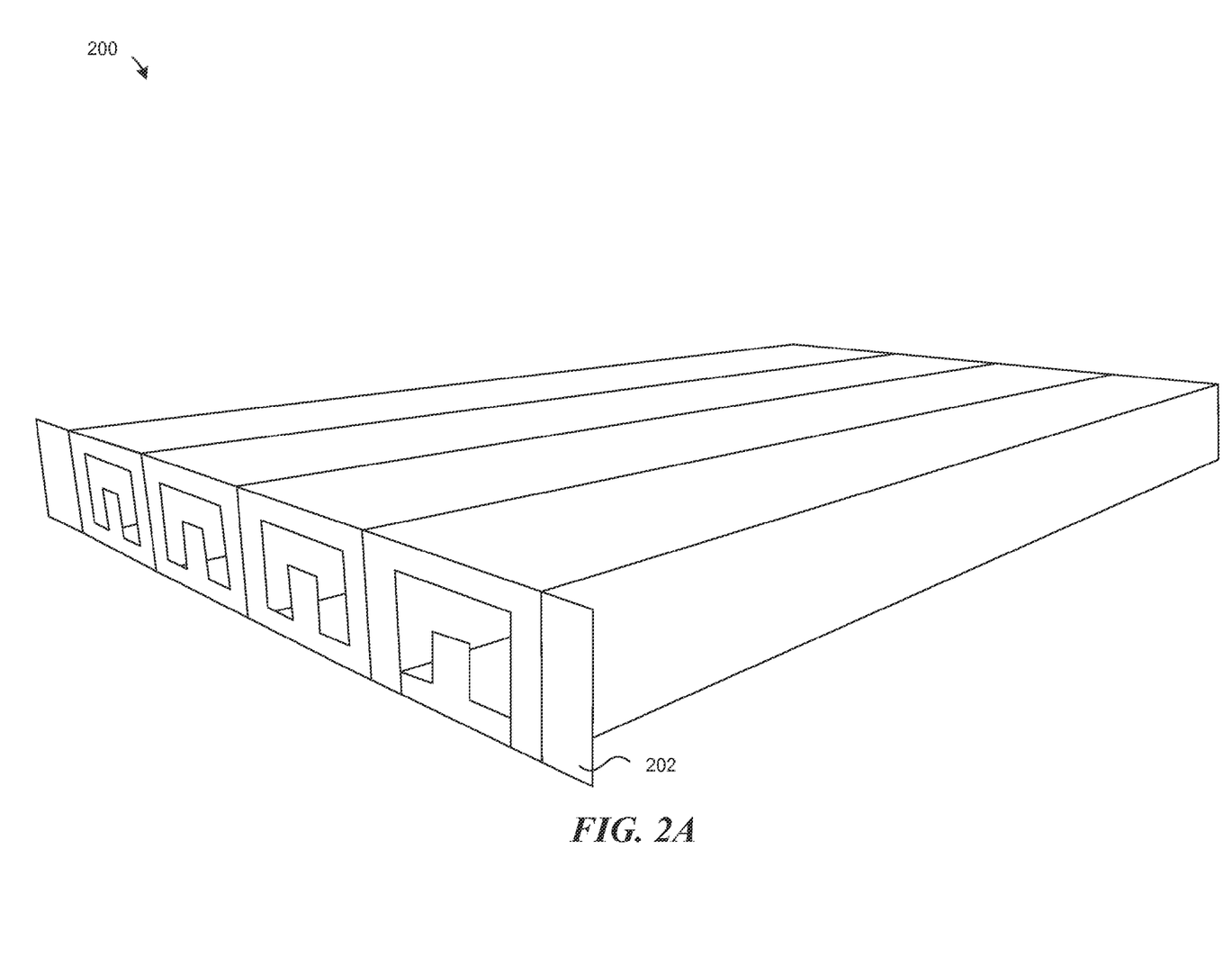
FIG. 2A is a perspective view of a rack shelf of multiple-data-storage-devices cartridges, consistent with various embodiments.

FIG. 2A is a perspective view of a rack shelf 200 of multiple-data-storage-devices cartridges, consistent with various embodiments. The multiple-data-storage-devices cartridges may be instances of the cartridge 100A illustrated in FIG. 1A. The rack shelf 200, as illustrated, includes a tray structure 202 securing four of the multiple-data-storage-devices cartridges. The tray structure 202 can be a standard 2U 19" wide rack mount, or a wider 21" wide rack mount, accommodating additional multiple-data-storage-devices cartridges.

Figure 2B:
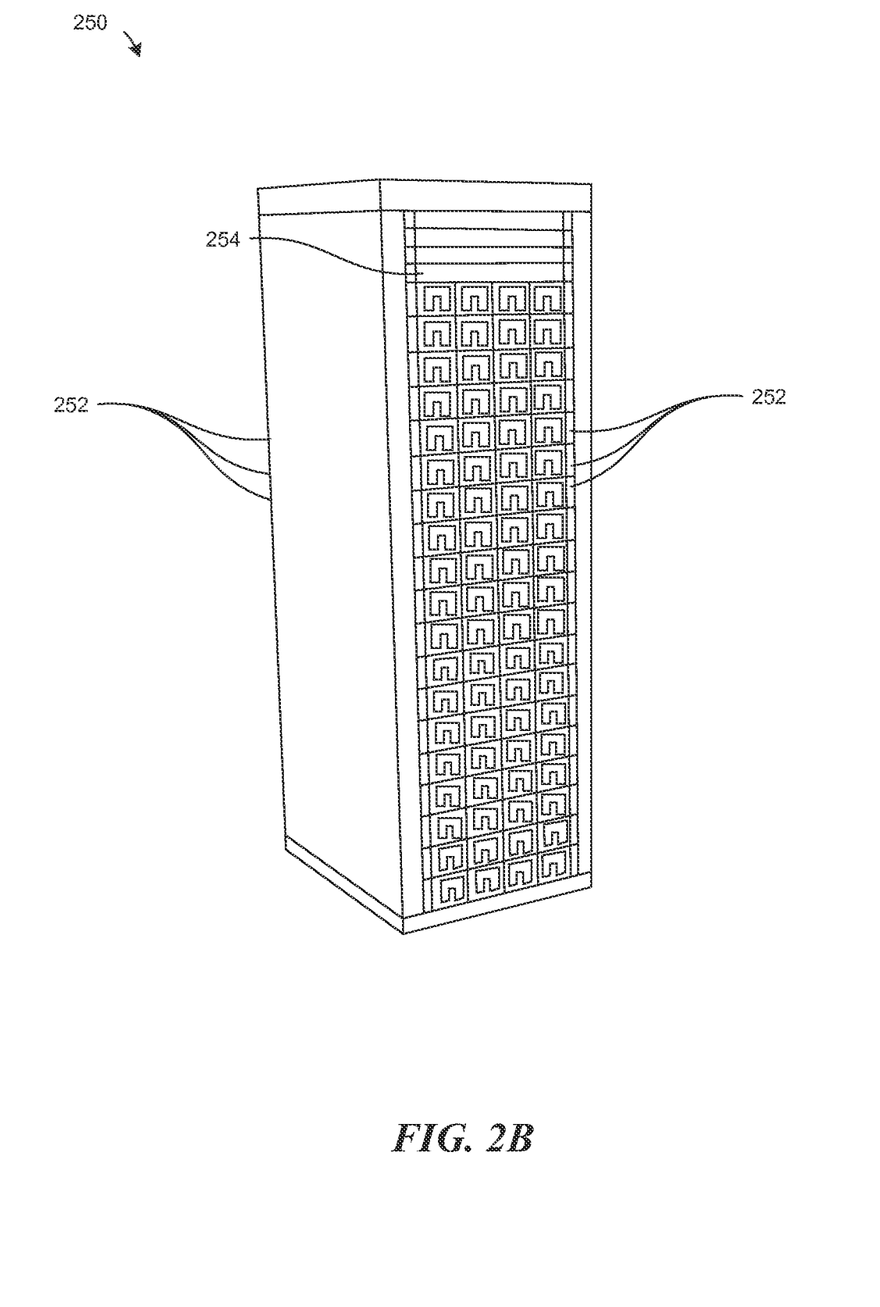
FIG. 2B is a perspective view of a rack including multiple rack shelves, consistent with various embodiments.
Figure 3:
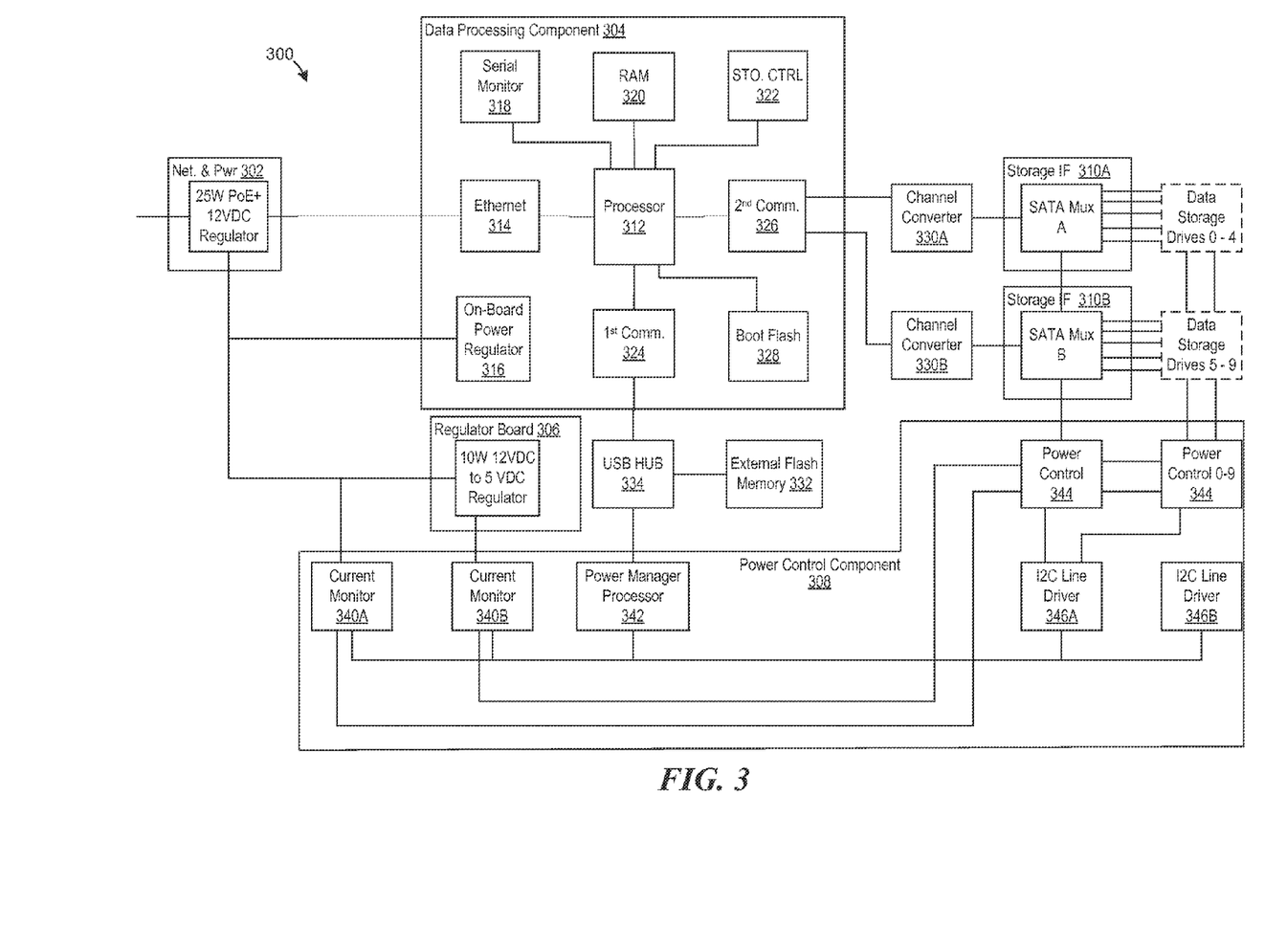
FIG. 3 is a block diagram illustrating a first example of a control circuitry of a multiple-data-storage-devices cartridge, consistent with various embodiments.

FIG. 2B is a perspective view of a rack 250 including multiple rack shelves, consistent with various embodiments. The rack shelves are instances of the rack shelf 200 illustrated in FIG. 2A. The rack 250 includes a stack of the rack shelves 200 each securely attached to a set of front and rear rails 252 spanning the width of rack 250. Management devices 254 may be placed at the top shelves of the rack 250. For example, the management devices 254 may include network switches, power regulators, front-end storage appliances, or any combination thereof FIG. 3 is a block diagram illustrating a first example of a control circuitry 300 of a multiple-data-storage-devices cartridge (the "cartridge"), consistent with various embodiments. The cartridge can be the cartridge 100A of FIG. 1A. Data storage devices (e.g., the data storage devices 104 of FIG. 1A) within the cartridge are shown as dashed line boxes. In the illustrated example, the control circuitry 300 includes separate components in communication with one another. The control circuitry 300 includes a network and power component 302, a data processing component 304, a regulator component 306, a power control component 308, and storage interface components 310 (e.g., a Serial Advanced Technology Attachment (SATA) multiplexer 310A and a SATA multiplexer 310B, collectively the "storage interface components 310").

The network and power component 302 interfaces with or includes a data connection port (e.g., the data connection port 112 of FIG. 1A). The network and power component 302, for example, can be a PoE plus circuit board. The network and power component 302 can both facilitate network communication for and supply power to the control circuitry 300 via the data connection port. The data processing component 304 provides storage management and data access functionalities for the cartridge. The data processing component 304, for example, can be an integrated circuit processor board. The regulator component 306 provides power at a different voltage than provided by the network and power component 302. In some embodiments, the regulator component 306 can be a power regulator circuit board.

The power control component 308 monitors the power supplied by the network and power component 302 and selectively provides power to the components of the control circuitry 300 and other components within the cartridge. The power control component 308, for example, can be a power control circuit board. The storage interface components 310 and are hubs that combines multiple interconnections with the data storage devices into a combined interconnection to interface with the data processing component 304. The storage interface components 310, for example, can be Serial Advanced Technology Attachment (SATA) multiplexer circuit boards or similar boards used for SAS connectors. Each of the storage interface components 310 multiplexes data communication signals to and from data storage devices in the cartridge and relays the multiplexed data communication signal, e.g., through a single cable, e.g., a Universal Serial Bus (USB), to the data processing component 304.

The network and power component 302 may include a PoE plus direct current (DC) regulator. The DC regulator can provide up to 25 W of power and a 12V potential. The network and power component 302 can both provide a data connection through and draw power from the data connection port.

The data processing component 304 provides the main intelligence in the cartridge to access data within the data storage devices. The data processing component 304 may include a processor 312, an Ethernet module 314, an on-board power regulator 316, a serial monitor module 318, a random access memory module 320, a storage controller module 322 (e.g., a SATA controller), a first communication module 324 (e.g., a USB controller), a second communication module 326 (e.g., a USB controller), and an internal boot flash 328. The processor 312 can be a low power mobile device processor, e.g., the Marvell ARMS processor. In various embodiments, power is always provided to the processor 312 while the control circuitry 300 is active. The Ethernet module 314 connects to the network and power component 302 via a data connection cable to provide digital data communication between the data processing component 304 and other computing devices in an external computing network. The on-board power regulator 316 receives a 12V direct current (DC) power connection from the network and power component 302 and converts that to a voltage acceptable to power the modules of the data processing component 304. The serial monitor module 318 enables textual data to be sent to and from the data processing component 304.

The random access memory module 320 provides operational memory for applications (e.g., programs running on an operating system) and instructions executed via the processor 312. The storage controller module 322 is a communication controller, e.g., an implementation of a physical layer of the Open Systems Interconnection (OSI) model. The storage controller module 322 communicates with the data storage devices in the cartridge. For example, the storage controller module 322 can be a SATA controller chip. The first communication module 324 is a communication controller (e.g., an implementation of a physical layer of the OSI model). The first communication module 324 provides the capability to communicate with, for example, the power control component 308. As a specific example, the first communication module 324 can be a USB controller chip.

In some embodiments, the storage controller module 322 has a data communication port that communicates directly with the data storage devices through the storage interface components 310. In other embodiments as shown, the communication channel used by the data storage devices is not directly connected to the data processing component 304. That is, the storage controller module 322 does not have a data communication port. In such cases, the second communication module 326 can provide a port to communicate with the storage interface components 310. The second communication module 326 (e.g., a USB controller) can have similar capabilities as the first communication module 324. As shown, channel converters 330 (e.g., USB-to-SATA converter 330A and USB-to-SATA converter 330B, collectively, the "channel converters 330") can be used to provide data connection between the data processing component 304 and the storage interface components 310 via the second communication module 326.

The internal boot flash 328 is a flash memory device. The data processing component 304 can implement an operating system, for example, a Linux operating system variant. The internal boot flash 328 can store executable instructions for the operating system. Alternatively or additionally, an external flash memory 332 may serve a similar function as the internal boot flash 328. The external flash memory 332 may be coupled to the data processing component 304, e.g., through a USB connection. As shown, a USB hub 334 can be used to connect the external flash memory 332, the first communication module 324 of the data processing component 304, and the power control component 308.

The power control component 308 includes current monitors 340 (e.g., current monitor 340A and current monitor 340B, collectively as the "current monitors 340") that monitor current consumption levels within the control circuitry 300. For example, the current monitors 340 can monitor voltage rails provided by power regulators (e.g., the regulator component 306 providing 5V rails or the internal regulator of the network and power component 302 providing 12V rails) within the control circuitry 300. The power control component 308 includes a power manager module 342 (e.g., an embedded microprocessor with USB and I2C interfaces) that controls power management, provides a communication interface to receive instructions from the data processing component 304, as well as send messages to the data processing component 304. Such instructions along with current consumption level readings are delivered to power controllers 344. In some embodiments, line drivers (e.g., line driver 346A and line driver 346B, collectively as the "line drivers 346") may be used to convert the I2C instructions to outputs interpretable by the power controllers 344. Each of the power controllers 344 can turn power on and off to one or more components of the cartridge. For example, one of the power controllers 344 can control all of the storage interface components 310. Alternatively, individual power controllers can, respectively, control individual storage interface components. For another example, individual power controllers can, respectively, control individual data storage devices.

Figure 4:
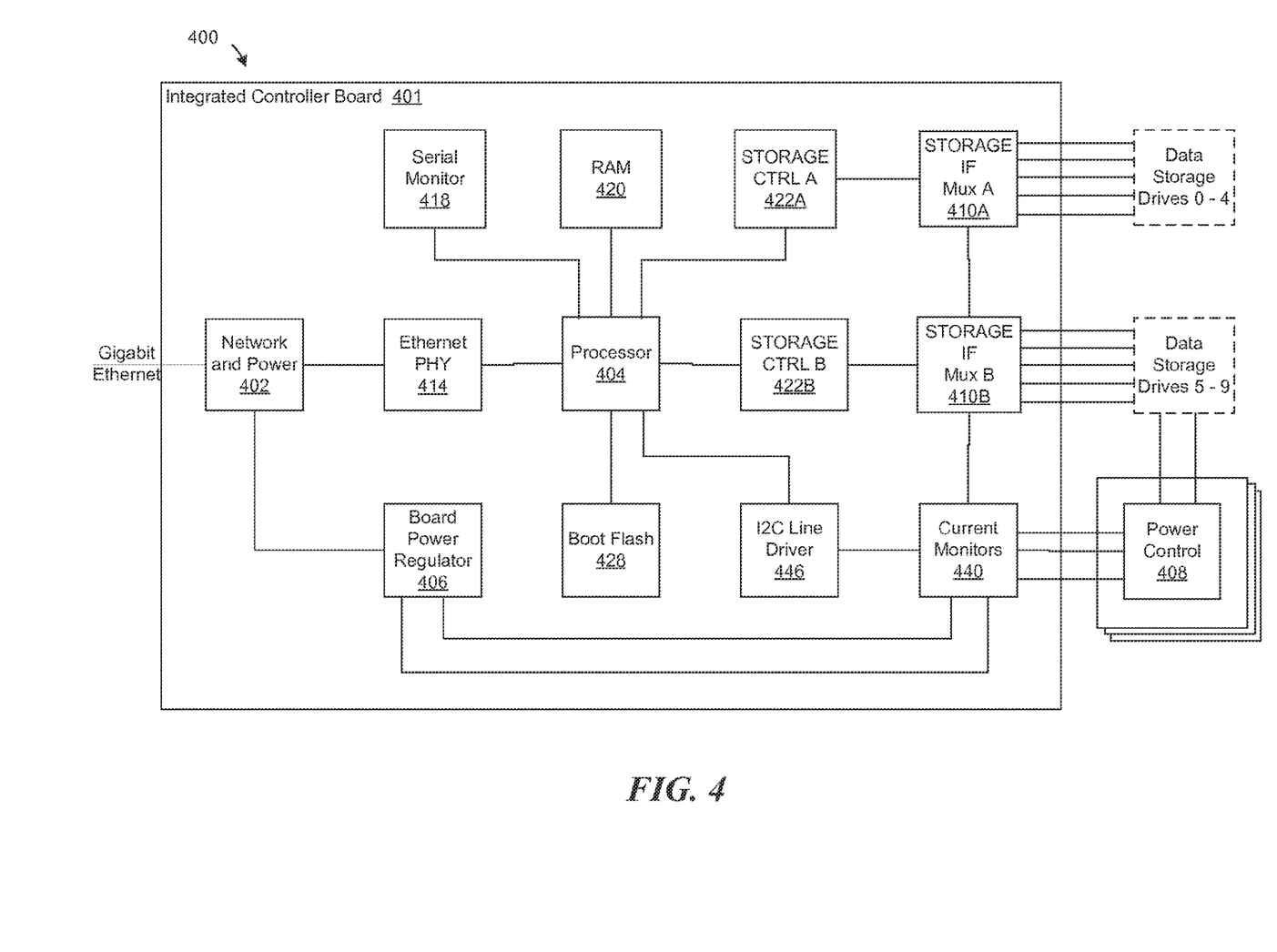
FIG. 4 is a block diagram illustrating a second example of a control circuitry of a multiple-data-storage-devices cartridge, consistent with various embodiments.

FIG. 4 is a block diagram illustrating a second example of a control circuitry 400 of a multiple-data-storage-devices cartridge (the "cartridge"), consistent with various embodiments. The cartridge can be the cartridge 100A of FIG. 1A. Data storage devices (e.g., the data storage devices 104 of FIG. 1A) within the cartridge are shown as dashed line boxes. In the illustrated example, the control circuitry 400 includes integrated modules on an integrated device 401. For example, the integrated device 401 can be an integrated controller board.

The integrated device 401 includes a network and power module 402, a data processing module 404, an on-board power regulator 406, a power control module 408 (that can be either be on the integrated device 401 or external to the integrated device 401), storage interface modules 410, an Ethernet module 414, a serial monitor module 418, a random access memory module 420, storage controller modules 422 (e.g., a storage controller 422A and a storage controller 422B, collectively as the "storage controllers 422"), a boot flash module 428, current monitors 440, and a line driver 446.

The network and power module 402 can perform the same functionalities as the network and power component 302 of FIG. 3. The network and power module 402 provides a voltage rail via a circuit board trace to the on-board power regulator 406. The on-board power regulator 406 can perform similar functionalities as the on-board power regulator 316 of FIG. 3. The on-board power regulator 406 converts the voltage rail from the network and power module 402 to power other modules in the integrated device 401 or in the control circuitry 400. The on-board power regulator 406 can be coupled to the current monitors 440 via circuit board traces. The current monitors 440 can perform the same functionalities as the current monitors 340 of FIG. 3.

The current monitors 440 are coupled to the power control module 408 via one or more power lines and a digital communication line. The power lines provide the voltage necessary for the power control module 408 to supply power to the data storage devices of the cartridge. The digital communication line provides both instructions from the data processing module 404 to activate a target set of the data storage device(s) and power monitoring data from the current monitors 440 (e.g., power/current consumption levels by the modules or components in the cartridge). The power consumption levels can be reported as relative to the maximum power available. The power consumption levels can be estimated/calculated as electric current consumption levels respectively multiplied by the voltage levels of the rails from which the electric currents are drawn.

The Ethernet module 414 can perform the same functionalities as the Ethernet module 314 of FIG. 3. The Ethernet module 414 can couple with the network and power module 402 via a digital communication line. The Ethernet module 414 can interpret any signals received through the network and power module 402. For example, the network and power module 402 can receive a data access message (e.g., a write request or a read request) and pass through that message to the Ethernet module 414. The Ethernet module 414 then passes this information to the data processing module 404.

The data processing module 404 can access and provide an operating system stored on the boot flash module 428 by loading the operating system into the random access memory module 420 for run-time execution. Upon receiving the data access message, a data access program running on the operating system can determine which of the data storage devices to turn on and instruct the power control module 408 to switch on such data storage devices. For example, the data access program can send the instruction to the power control module 408 by relaying through the line driver 446 and/or the current monitors 440. The power control module 408 can then perform a power switching mechanism (e.g., the process described later in FIG. 5) to activate such data storage devices. The power control module 408 may also determine when to turn on one or both of the storage interface modules 410 in accordance with the power switching mechanism.

Once both the target data storage devices and corresponding storage interface modules 410 are turned on, the data access program can then mount the target data storage devices. The data access program maintains a service to provide read or write access for the clients that send data access messages to the cartridge.

Regarding FIG. 3 and FIG. 4, portions of components and/or modules associated with the control circuitry 300 or the control circuitry 400 may each be implemented in the form of special-purpose circuitry, or in the form of one or more appropriately programmed programmable processors, or a combination thereof For example, the modules described can be implemented as instructions on a tangible storage memory capable of being executed by a processor or a controller in the control circuitry. The tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof. Memory space and storages described in the figures can be implemented with the tangible storage memory as well, including volatile or non-volatile memory.

Each of the modules and/or components may operate individually and independently of other modules or components. Some or all of the modules may be executed on the same host device or on separate devices. The separate devices can be coupled together through one or more communication channels (e.g., wireless or wired channels) to coordinate their operations. Some or all of the components and/or modules may be combined as one component or module.

A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component. In some embodiments, at least some of the modules can be upgraded or modified remotely. The control circuitry 300 or the control circuitry 400 may include additional, fewer, or different modules for various applications.

Figure 5:
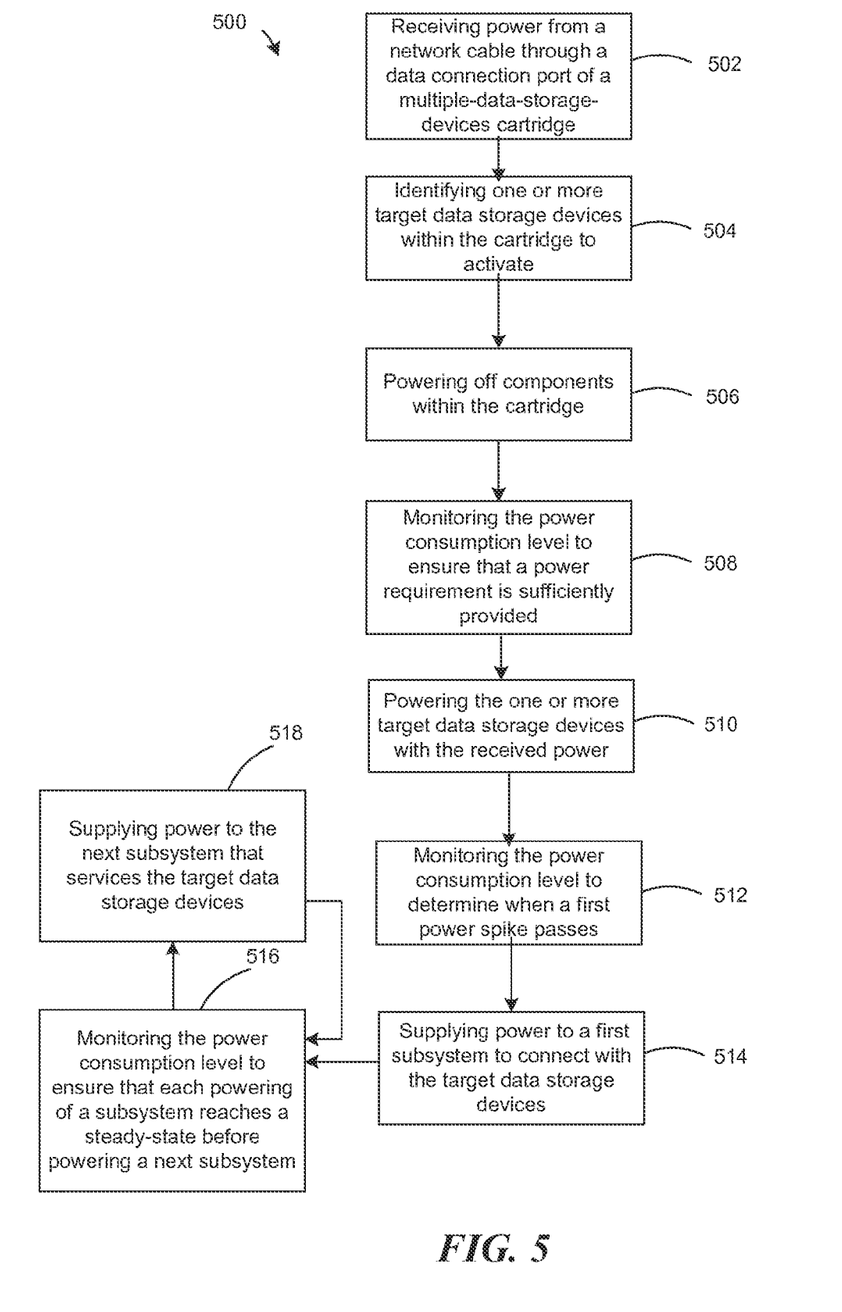
FIG. 5 is a flow chart of a process of operating a multiple-data-storage-devices cartridge.

FIG. 5 is a flow chart of a process 500 of operating a multiple-data-storage-devices cartridge (the "cartridge"). The multiple-data-storage-devices cartridge, for example, can be the multiple-data-storage-devices cartridge 100A of FIG. 1A. The cartridge can receive, at block 502, power from a network cable connected to the cartridge through a data communication port, e.g., the data connection port 112 of FIG. 1A, the network and power component 302 of FIG. 3, or the network and power module 402 of FIG. 4. The network cable, for example, can be an Ethernet cable carrying power in accordance with the PoE or PoE plus standard. In various embodiments, the power received is unable to power up every data storage device within the cartridge, and thus the cartridge selectively powers one or more data storage devices with the received power.

That is, a control circuitry of the cartridge can identify, at block 504, one or more target data storage devices within the cartridge to activate. The control circuitry can be the control circuitry 300 of FIG. 3 or the control circuitry 400 of FIG. 4. The target data storage devices herein can also be referred to as the "target set." Then at block 506, the control circuitry powers off components within the cartridge other than the one or more target data storage devices. A power management component (e.g., the power control component 308 of FIG. 3 or the power control module 408 of FIG. 4) of the control circuitry monitors, at block 508, the power consumption level drawn from the network cable to ensure that a power requirement to activate the one or more target data storage devices is sufficiently provided by the received power.

In some embodiment, the term "activate" here refers to transitioning a data storage device to a state that draws more power from a "deactivated" state. For example, to activate can refer to spinning up a hard disk, or simply turning on higher power consumption electrical components within a hard disk. In other embodiments, activate means to supply power. In some embodiments, the "deactivated" state refers to when power is completely cut off from the data storage device. In other embodiments, the "deactivated" state refers to when power consumption is supplied at a reduced level such that more power needs to be supplied to the data storage device in order to access the data storage device.

At block 510, the control circuitry instructs the power management component to power the one or more target data storage devices with the received power to activate the target data storage devices. At block 512, the power management component continues to monitor the power consumption level drawn from the network cable to determine when a first power spike returns to a flattened steady-state. The first power spike occurs in response to the one or more target data storage devices being activated. For example, when a hard disk drive spins up, a large amount of power is consumed before the power consumption level drops down to a steady-state. Hence, block 512 includes determining when the power consumption level of the one or more target data storage devices drops down to a steady-state.

In response to determining that the first power spike has flattened and reached a steady-state, the control circuitry instructs, at block 514, the power management component to supply power to a first subsystem to connect with the one or more target data storage devices. For example, the first subsystem can be a first storage interface subsystem, e.g., one of the storage interface components 310 of FIG. 3 or one of the storage interface modules 410 of FIG. 4.

The power management component continues to monitor, at block 516, the power consumption level drawn from the network cable to ensure that each powering of a subsystem (e.g., the first subsystem) reaches a steady-state before powering another subsystem. The control circuitry then instructs, at block 518, the power management component to supply power to a next subsystem that services the one or more target data storage devices. The control circuitry repeats block 516 and block 518 until all necessary subsystems for servicing the one or more target data storage devices are activated.

While processes or blocks are presented in a given order in FIG. 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

It is understood that the use of relational terms, if any, such as first and second, and the like, are used solely for distinguishing one entity or action from another, without necessarily requiring or implying any such actual relationship or order between such entities or actions.

This disclosure includes other aspects, elements, features, and steps in addition to or in place of what is described in the figures. These potential additions and replacements are described throughout the specification. For example, some embodiments of the disclosure involve a method of controlling power within a multiple data storage devices enclosure (the "enclosure"), where the power provided to the enclosure is not sufficient to power up every data storage device within the enclosure. The method includes: receiving a network connection and power from a data connection port removably coupled to a network cable; identifying one or more target data storage devices within the multiple-data-storage-devices enclosure to activate, wherein the one or more target data storage devices are a subset of all data storage devices within the multiple-data-storage-devices enclosure; powering off at least one of the data storage devices, within the multiple-data-storage-devices enclosure, that draws power from the data connection port to make available additional power to supply from the data connection port; and powering the target data storage devices with the power received through the data connection port to activate the target data storage devices after all other data storage devices are powered off. The method may also include receiving a data request from the network connection. The one or more target data storage devices can be selected based at least partly on the data request. Alternatively, the target data storage devices can be selected based at least partly on a set schedule stored in the enclosure. A processor or controller of the enclosure can periodically or dynamically optimize the set schedule to increase the lifetime of the data storage devices.

The enclosure can sequentially (i.e., one at a time) power on and establish data connection with each of the target data storage devices. After powering on each of the target data storage devices, the enclosure can monitor a power consumption level of voltage rails electrically coupled to the data connection port to determine when a first power spike of the power consumption level reaches a steady-state after the target data storage device is activated; and power on a storage interface subsystem to connect with the target data storage device after the first power spike reaches the steady-state. The enclosure can further monitor the power consumption level of voltage rails electrically coupled to the data connection port to determine when a second power spike of the power consumption level reaches steady-state after the storage interface subsystem is powered on; and powering a network I/O subsystem for the multiple-data-storage-devices enclosure after the second power spike reaches steady-state. The data processing component can establish a data connection with the target data storage device after the target data storage device and the subsystems servicing the target data storage device (e.g., the storage interface subsystem and the network I/O subsystem) are activated. Powering on each of the target data storage devices can be responsive to determining that the power requirement is sufficiently provided. The data connection with the target data storage device can be established by mounting the target data storage device in an operating system implemented by the data processing component.

Other embodiments involve a multiple-data-storage-devices enclosure. The enclosure comprises: two or more data storage devices; one or more data communication ports to receive a data connection to a computer network and to receive and supply power to the multiple-data-storage-devices enclosure, wherein the data communication ports are adapted to receive enough/sufficient power to turn on only a subset of the two or more data storage devices; and control circuitry comprising memory and a computing component, wherein the computing component is configured to identify a target subset of the two or more data storage devices that are to be activated, direct power from one or more of the data communication ports to the identified target subset, and withhold power from other data storage devices not part of the target subset. The enclosure can further comprise a network and power component that provides both a data communication line to the control circuitry and a power supply line to the control circuitry, wherein the network and power component includes or is directly coupled to one or more of the data communication ports. For example, the network and power component is a Power of Ethernet module. The enclosure can also further comprise a power management component that switches on and off power supplied to the two or more data storage devices, wherein the power management component is electrically coupled to the power supply line and in data communication with the computing component to receive instructions to activate the target subset of the two or more data storage devices. The network and power component, the computing component, and the memory can be part of an integrated component of the control circuitry. The power management component can also be part of the integrated component. Alternatively, the power management component is a power control board separate from other modules or components of the control circuitry.

The enclosure also further comprises an enclosure shell that serves as an exterior of the multiple-data-storage-devices enclosure, encloses the control circuitry and the two or more data storage devices stacked in columns, and exposes one or more of the data communication ports. The enclosure shell is adapted to fit on an external tray with the columns standing upright. The control circuitry is sandwiched within one of the columns bordering a side of the enclosure shell such that a network and power component of the control circuitry can be directly coupled to one or more of the data communication ports. The enclosure shell is adapted to enclose the two or more data storage devices such that once the data storage devices are stacked within the enclosure shell, an individual data storage device cannot be accessed from outside the enclosure shell to replace the individual data storage device.

Yet other embodiments involve a method of power management in a multiple data storage devices enclosure. The method includes: receiving a network connection and power from a data connection port detachably coupled to a network cable; identifying a subset of data storage devices within the enclosure to activate; powering off components within the enclosure other than the subset of the data storage devices; and activating each data storage device in the subset that is not yet powered. Each data storage device may be activated by: monitoring power consumption drawn from the data connection port; identifying a sequence of components associated with the data storage device, wherein the components within the sequence, when powered, together provide access to the data storage device; and powering on each component in the sequence when a previous component in the sequence has reached a steady state power consumption level.

When powering on each component in the sequence, the enclosure can wait until both the previous component in the sequence has reached a steady state power consumption level and the monitored power consumption provides sufficient available power to activate the component. Powering off the one or more components may include powering off every data storage device in the enclosure other than the target data storage device. Powering off the components may include powering off every storage controller in the enclosure. Powering off the components may include disconnecting a voltage supply from a power regulator coupled to the data connection port and/or instructing a first component to reduce current draw from a voltage supply provided by a power regulator coupled to the data connection port. The sequence of components includes the target data storage device and a storage controller for the data storage device in that order followed by a network component that provides I/O service for the data storage device. The sequence of components can be hardcoded in a power control circuit of the enclosure.

The method of power management may further include providing voltage rails with power regulators electrically coupled to the data connection port, and monitoring the power consumption by monitoring electrical current drawn from each of the voltage rails via a current meter. Activating each data storage device in the subset may further include mounting, via a processor configured to implement an operating system, the data storage device after the components within the sequence are powered on, such that the operating system can access data ranges within the data storage device.

Further, some embodiments involve a control circuitry in a multiple-data-stoage-devices enclosure. The control circuitry includes: a memory storing executable instructions; a network and power component adapted to accept a network cable to receive a data connection to a network and to receive power; one or more storage controllers adapted to provide access to two or more data storage devices; a processor component configured by the executable instructions to identify a subset of the two or more data storage devices to activate; one or more current meters adapted to measure at least a current level through a voltage rail electrically coupled to the network and power component; a power control component configured to activate each data storage device of the subset. Each data storage device may be activated by: identifying a sequence of components associated with the data storage device, wherein the components within the sequence, when powered, together provide access to the data storage device; and powering, in a consecutive order, each component in the sequence when a previous component in the sequence has reached a steady state power consumption level according to the measured current level by the one or more current meters.

What is claimed is:

1. A method of controlling power within an enclosure comprising:
   receiving, via a network cable connected at a data connection port of the enclosure, a data connection and power;
   identifying, at a data processing component of the enclosure, a target data storage device to activate, wherein the identified target storage device is one of multiple candidate data storage devices within the enclosure;
   powering off, via a power management component of the enclosure, at least one of the data storage devices that draws power from the data connection port to make available additional power to supply from the data connection port; and
   powering on, via the power management component, the target data storage device with the power received via the data connection port to activate the target data storage device after all other data storage devices are powered off.

2. The method of claim 1, further comprising monitoring a power consumption level through the data connection port to determine when a power requirement to activate the target data storage device is sufficiently provided by the power received; wherein powering the target data storage device is responsive to determining that the power requirement is sufficiently provided.

3. The method of claim 1, further comprising establishing, at the data processing component, a data connection with the target data storage device after the target data storage device is powered on.

4. The method of claim 3, wherein establishing the data connection with the target data storage device is by mounting the target data storage device in an operating system implemented by the data processing component.

5. The method of claim 1, wherein the power provided through the data connection port is insufficient to power up every data storage device within the enclosure.

6. The method of claim 1, further comprising receiving, via the data connection, a data request, wherein identifying the target storage device is based at least partly on the data request.

7. The method of claim 1, wherein identifying the target storage device is based at least partly on a schedule.

8. A method of controlling power within an enclosure comprising:
   receiving a network connection and power from a data connection port to which a network cable is detachably coupled;
   identifying one or more target data storage devices within the enclosure to activate, wherein the one or more target data storage devices are a subset of all data storage devices within the enclosure;
   powering off at least one of the data storage devices that draws power from the data connection port to make available additional power to supply from the data connection port; and
   powering the target data storage devices with the power received through the data connection port to activate the target data storage devices after all other data storage devices are powered off.

9. The method of claim 8, wherein powering the target data storage devices includes sequentially powering the target data storage devices one at a time.

10. An enclosure comprising:
    two or more data storage devices;

a data communication port configured to receive a data connection to a computer network, and to receive and supply power to the enclosure, wherein the data communication port is configured to receive enough power to turn on only a target subset of the two or more data storage devices; and control circuitry comprising memory and a computing component, wherein the computing component is configured to identify the target subset of the two or more data storage devices that are to be activated, direct power from the data communication port to the identified target subset, and withhold power from at least one of other data storage devices not part of the target subset.

11. The enclosure of claim 10, further comprising a network and power component that provides both a data communication line to the control circuitry and a power supply line to the control circuitry, wherein the network and power component includes or is directly coupled to the data communication port.

12. The enclosure of claim 11, wherein the network and power component is a Power over Ethernet module.

13. The enclosure of claim 11, wherein the network and power component, the computing component, and the memory are part of an integrated component of the control circuitry.

14. The enclosure of claim 11, further comprising a power management component that switches on and off power supplied to the two or more data storage devices, wherein the power management component is electrically coupled to the power supply line and in data communication with the computing component to receive instructions to activate the target subset of the two or more data storage devices.

15. The enclosure of claim 14, wherein the power management component, the network and power component, the computing component, and the memory are part of an integrated component of the control circuitry.

16. The enclosure of claim 14, wherein the power management component is a power control board separate from other modules or components of the control circuitry.

17. The enclosure of claim 10, further comprising an enclosure shell that serves as an exterior of the enclosure, encloses the control circuitry and the two or more data storage devices stacked in columns, and exposes the data communication port.

18. The enclosure of claim 17, wherein the enclosure shell is adapted to fit on an external tray with the columns standing upright.

19. The enclosure of claim 17, wherein the control circuitry is located within the enclosure shell such that the network and power component of the control circuitry can be directly coupled to the data communication port.

20. The enclosure of claim 17, wherein the enclosure shell is adapted to enclose the two or more data storage devices such that once the data storage devices are stacked within the enclosure shell, an individual data storage device cannot be accessed from outside the enclosure shell to replace the individual data storage device.

\* \* \* \* \*